United States Patent [19]
Laurenti

[11] 3,782,741
[45] Jan. 1, 1974

[54] UNITARY, DOUBLE ENDED CHUCK OR COUPLING
[76] Inventor: Alfred Laurenti, 35 Essex St., Lawrence, Mass.
[22] Filed: Oct. 20, 1972
[21] Appl. No.: 299,626

[52] U.S. Cl. .................. 279/62, 279/60, 279/1 DC
[51] Int. Cl. ............................................ B23b 31/04
[58] Field of Search ................. 279/61, 60, 62, 63, 279/64, 65, 1 DC

[56] References Cited
UNITED STATES PATENTS
3,462,164   8/1969   Wightman............................ 279/62

Primary Examiner—Gil Weidenfeld
Attorney—Pearson & Pearson

[57] ABSTRACT

A double ended chuck, connector or shaft coupling includes a pair of back-to-back key operated chucks having a common main body upon which one set of oppositely disposed inclined jaws extends beyond and moves in the spaces between the jaws of the opposite set. The ring gears at each end are split for radial insertion behind the respective end heads and are held in place by split covers in turn held in place by a cylindrical shell sleeved thereover.

5 Claims, 7 Drawing Figures

PATENTED JAN 1 1974 3,782,741
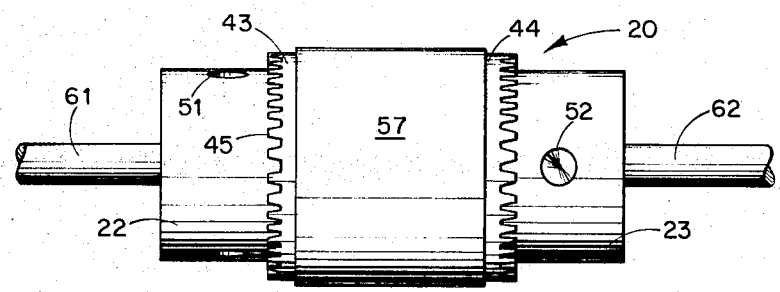
Fig. 1.
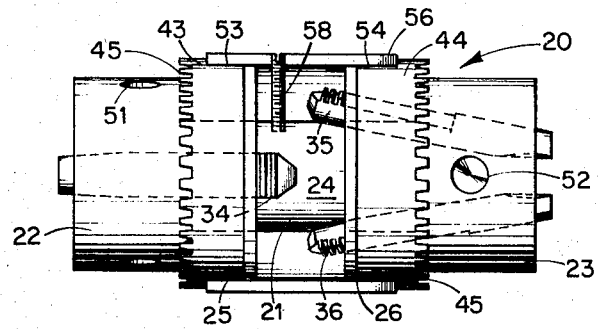
Fig. 2.
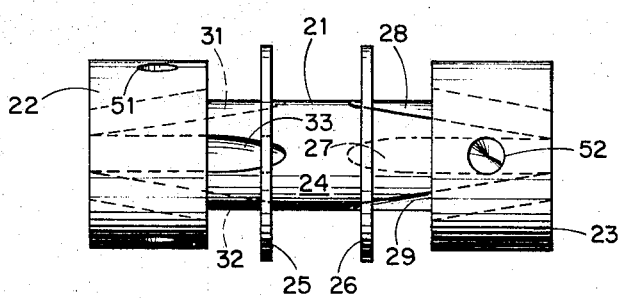
Fig. 3.
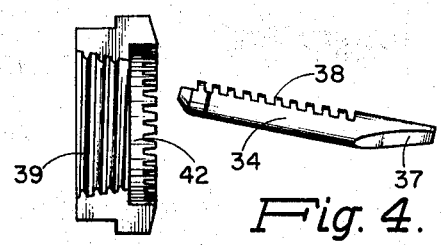
Fig. 4.
Fig. 5.
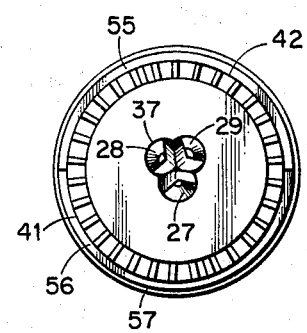
Fig. 7.
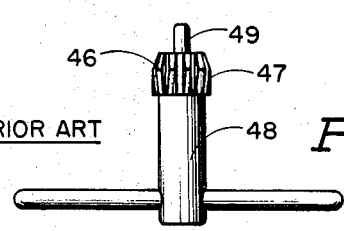
PRIOR ART Fig. 6.

UNITARY, DOUBLE ENDED CHUCK OR COUPLING

BACKGROUND OF THE INVENTION

In home work shops, machine shops and manufacturing establishments, it is often desirable to utilize the same motor for driving various devices. Usually any couplings on hand will connect to only one device and are not adjustable in size. The aligned shafts of the drive motor and other driven devices must therefore be connected by some expedient, such as a short solid, or tubular, shaft having an axial bore at one end which fits the motor shaft and an axial bore at the other end which fits the shaft of the driven device. As far as I am aware, there is no coupling available on the market which has adjustable jaws at each opposite end to connect shafts of different diameters and which has a unitary body incapable of working loose during rotation.

SUMMARY OF THIS INVENTION

In this invention a double ended, unitary chuck, connector or coupling is provided in which each end has three inclined jaws movable in grooves in Jacobs type heads to grip and release shafts of various diameters when a pinion gear handle pin is turned in a blind pin hole in the heads. The apparatus is characterized by having the cylindrical heads on a common, one piece body so that the opposite jaws and shafts must rotate together and cannot work loose. The ring gears, which move the jaws, are split, since they would not fit over the heads if unsplit, and are exteriorly grooved to seat split, semi-circular covers in turn retained by a cylindrical shell sleeved thereover.

BRIEF DESCRIPTION OF THE DRAWINGS

FIG. 1 is a side elevation of a device constructed in accordance with the invention;

FIG. 2 is an enlarged view, similar to FIG. 1, but with the shell and covers removed;

FIG. 3 is a view similar to FIG. 2 showing the one piece, unitary, common body of the device;

FIG. 4 is a side elevation of a toothed, movable jaw;

FIG. 5 is a side elevation of one-half of the split ring gear;

FIG. 6 is a side elevation of the key, handle, pinion gear and pin; and

FIG. 7 is an end elevation of one end of the device.

DESCRIPTION OF A PREFERRED EMBODIMENT

As shown in the drawing, the unitary, double ended chuck, connector or coupling 20 of the invention includes a unitary, common, one piece body 21 (FIG. 3) having Jacobs chuck type heads 22 and 23 at each opposite end and an intermediate cylindrical shank 24 of reduced diameter. A pair of integral, annular discs 25 and 26 are spaced along the shank 24 in the space between the heads. At least three inclined guideways 27, 28 and 29 are provided in one end of the body 21 at spaced distances therearound and at least three similar guideways 31, 32 and 33 are provided at spaced distances around the other end of the body, in staggered arrangement, so that the respective elongated jaws, such as 34, 35 and 36 slidable therein (FIG. 2), may overlap when retracted to shorten the length of the chuck.

Each jaw, such as 34, 35 and 36, includes a tapered tip 37 adapted to engage and grip a shaft or tool with its adjacent tips and includes exterior teeth, or threads, 38 adapted to be engaged by the interior helical threads 39 of the two mating halves 41 and 42 of the jaw operating members, or ring gears, 43 or 44.

Each ring gear 43 or 44 includes the teeth 45 which mesh with corresponding teeth 46 on the pinion gear 47 of the key handle 48, when the pin 49 is seated in one of the blind pin holes 51 or 52 in one of the cylindrical heads 22 or 23.

It will be seen that the diameter of the threads 39 of the split ring gears 43 or 44 is less than the diameter of the heads 22 and 23, so that the gears could not be installed if of full annular configuration. They are thus each split into two halves 41 and 42 and inserted radially between a head and the adjacent disc 25 or 26 to prevent axial movement and provided with an exterior cover groove 53 or 54 which seat the split covers 55 and 56. The semi-circular covers 55 and 56 are prevented from radial movement by the cylindrical shell 57 sleeved thereon and preferably each cover half 55 and 56 is attached to the shank 24 of body 21 by a suitable screw 58.

By means of key 48, each end of the unitary chuck 20 can be adjusted in diameter to conform to the diameter of aligned shafts, such as 61 and 62, of various diameters, the jaws moving from projected gripping position to retracted releasing position and overlapping the opposite jaws in the latter position.

I claim:

1. A unitary, double ended chuck, said chuck comprising:
   a one-piece body having oppositely disposed at each end thereof at least three inclined guideways and a plurality of spaced blind radial key bores, toothed tool engaging jaws movable in said guideways from projected tool gripping position to retracted tool releasing position;
   a pair of jaw operating members, each formed of two mating halves, each having internal threads engaging the teeth of the adjacent jaws, each having ring gear teeth extending therearound and each having a cylindrical exterior face with a cover groove therein;
   a pair of semi-circular covers seated in said cover grooves; and
   a cylindrical shell sleeved over said covers.

2. A double ended chuck as specified in claim 1, wherein:
   the three toothed tool engaging jaws in the three guideways at one end of said chuck are located in the spaces between the three toothed tool engaging jaws of the three guideways at the other end thereof, to extend beyond each other and shorten the length of said chuck.

3. A double ended adjustable connecting device for joining a pair of axially aligned shafts, or the like, said device comprising:
   a pair of key operated chuck assemblies, each at an opposite end of a unitary, common, main body, said body including inclined guideways for the jaws of said chucks, an integral cylindrical head at each opposite end and a pair of integral annular discs axially spaced between said heads.

4. A connecting device as specified in claim 3, wherein:
   each said key operated chuck assembly includes a ring gear internally threaded to engage said jaws, each said ring gear being of less inner diameter than said heads and split to permit radial assembly thereof between one of said heads and the adjacent disc.

5. A connecting device as specified in claim 4, wherein: each said ring gear includes an exterior groove on the inside of the cylindrical surface thereof and said device includes a pair of semi-circular covers fitting in said grooves and a cylindrical shell sleeved over said covers.

* * * * *